United States Patent [19]
Reinheimer et al.

[11] 4,302,087
[45] Nov. 24, 1981

[54] MICROSCOPE ATTACHMENT CAMERA

[75] Inventors: Günter Reinheimer, Biebertal; Herbert Leiter, Wetzlar, both of Fed. Rep. of Germany

[73] Assignee: Ernst Leitz Wetzlar GmbH, Wetzlar, Fed. Rep. of Germany

[21] Appl. No.: 159,161

[22] Filed: Jun. 13, 1980

[30] Foreign Application Priority Data

Jun. 15, 1979 [DE] Fed. Rep. of Germany ....... 2924053

[51] Int. Cl.³ .................. G02B 21/18; G03B 17/48
[52] U.S. Cl. ............................. 354/79; 350/19
[58] Field of Search .................... 354/79; 350/19

[56] References Cited

U.S. PATENT DOCUMENTS

| | | | |
|---|---|---|---|
| 2,845,842 | 8/1958 | Leitz et al. | 350/19 |
| 3,417,685 | 12/1968 | Kato et al. | 350/19 X |
| 3,545,355 | 12/1970 | Cahill | 354/79 |
| 3,851,949 | 12/1974 | Kraft et al. | 350/19 X |
| 3,987,463 | 10/1976 | Nishikawa et al. | 354/79 X |
| 4,006,487 | 2/1977 | Allen | 354/79 |
| 4,057,318 | 11/1977 | Schindl | 354/79 X |
| 4,118,719 | 10/1978 | Leiter et al. | 354/79 |

Primary Examiner—Donald A. Griffin
Attorney, Agent, or Firm—Gilbert L. Wells

[57] ABSTRACT

An attachment camera for microscopes, comprising an apparatus for measuring the brightness of an object detail and markings for sighting at least the detail metering field and the image field of the camera in the observation beam. The metering field markings and the image field markings are located on two separate plates, the plate with the metering field marking is defined by a measuring field stop. The two markings differ in size and shape and are simultaneously reflected into the observation beam by means of a photographic ocular located in the picture taking beam and by means of optical components with partly or fully reflecting surfaces located before or after the photographic ocular.

A holder (5a) seating in exchangeable manner the photographic ocular (5) is provided between the housing (24) of the attachment-camera and the binocular tube (25).

6 Claims, 7 Drawing Figures

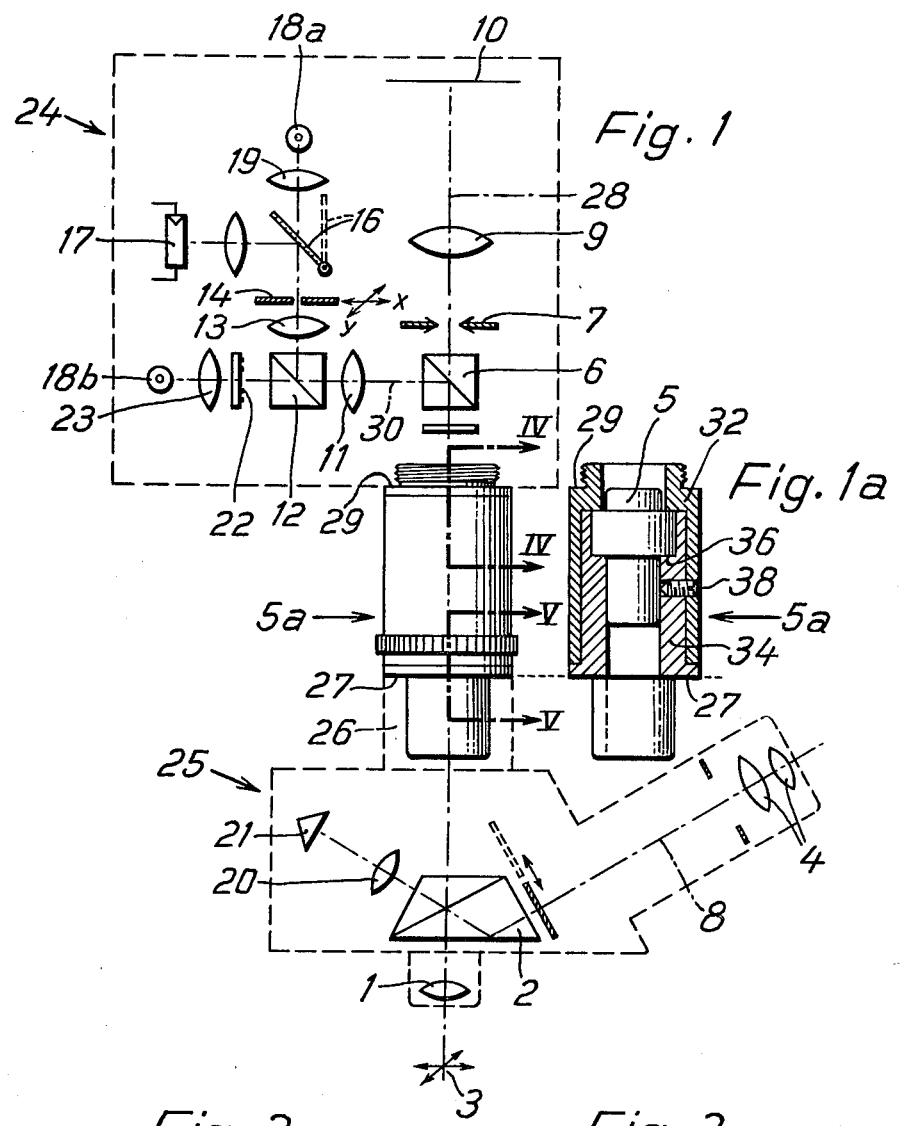
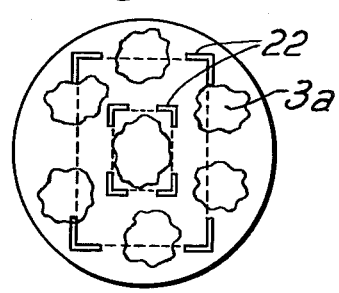
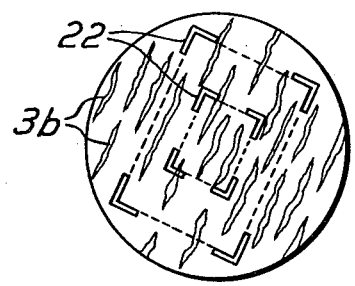

MICROSCOPE ATTACHMENT CAMERA

CROSS-REFERENCE TO RELATED APPLICATION

Applicants claim priority under 35 USC 119 for application No. P 29 24 053.7 filed June 15, 1979 in the Patent Office of the Federal Republic of Germany.

BACKGROUND OF THE INVENTION

The field of the invention is photography combined with the compound lens system of a microscope and the invention is particularly concerned with a microscope attachment camera with exposure metering for the photographic recording of an object or detail of same.

The state of the art of microscope attachment cameras may be ascertained by reference to U.S. Pat. No. 4,118,719 of the present inventors. U.S. Pat. No. 4,118,719 is incorporated herein because the present invention is an improvement thereover and like components are designated with the same reference numerals.

U.S. Pat. No. 4,118,719 discloses an attachment camera for microscopes having an observation beam with a system for measuring the brightness of an object detail and with markings for sighting at least the detail metering field and the image field of the camera in the observation beam. Markings for the metering field and for the image field are mounted on two separate plates. The metering field marking plate is defined by a metering field stop, and the two markings, which differ in shape and size, are reflected simultaneously be means of a photographic ocular located in the picture-taking beam and by optical components arranged ahead or behind the photographic ocular and comprising partly or wholly specular surfaces.

When a photographic ocular is changed, there is also a change of the marked field on the reticle (image field marking plate) on account of the change in magnification. When a photographic ocular is selectively used having a different magnification, the reticle which defines the image field therefore also requires corresponding markings for the different magnification stage. When a zoom photographic ocular is used, the conventional calibration of image formats on reticles cannot be implemented in a technically meaningful way since a large number of markings is required which could be used in the particular case applied only with very great difficulty. Furthermore, all intermediate positions are then merely estimated.

Besides the solution of the problem disclosed and defined in U.S. Pat. No. 4,118,719, apparatus is already known which in addition to viewing through the microscope tube proper also provides a separate adjusting telescope. While in this prior art device multiple markings on the reticle are avoided, on the other hand, a basic drawback is also thereby introduced: the operation of such attachment cameras is hampered by the fact that the observer must constantly look through the microscope tube proper and then through the separate adjusting telescope (camera viewing) and vice versa. The two tube microscope is disclosed in U.S. Pat. No. 3,987,463 and U.S. Pat. No. 4,006,487.

Lastly, photographic microscopes are known in which the picture taking field is superposed as a luminous frame on the microscope image. In this case, there is no change in the photographic oculars. Instead, optical systems are mounted between the objective and the microscope tube which change the magnification either stepwise or continuously. The drawback of these systems is that when a picture is taken of a rather small image detail, the overall magnification is increased and hence, the visible object field is reduced. An example of such a system is disclosed in U.S. Pat. No. 4,057,318.

Furthermore, all prior art apparatus suffer from the drawback that the object must be rotated, for instance by means of a turntable, in order to align the object structures with the boundary of the image field markings.

SUMMARY OF THE INVENTION

Having in mind the limitations of the prior art, it is an object of the present invention to improve upon the microscope attachment camera of U.S. Pat. No. 4,118,719 whereby the applicability and operational sequences are extended and perfected while the drawbacks inherent in the apparatus are averted.

This object is achieved for the attachment camera of U.S. Pat. No. 4,118,719 in that a holding means exchangeably seating the photographic ocular is provided between the housing of the attachment camera and a tube of the binocular. Where appropriate, the holding means may be detachably joined to the housing of the attachment camera. Advantageously, this holding means is provided with an annular attachment resting surface both in its object facing region and its camera facing area and further a photographic stub mounted on the binocular tube assumes a cylindrical geometry corresponding to the attachment resting surface of the object side for partly seating the holding means. In a further embodiment, it is possible to support the housing of the attachment camera in rotatable manner about an axis coinciding with that of the imaging beam. In another embodiment, the housing of the attachment camera together with the holding means is supported so that it is rotatable about an axis coinciding with that of the imaging beam. In a special embodiment of the present invention, the photographic ocular which is seated in exchangeable manner in the holding means is a zoom photographic ocular.

The apparatus of the present invention offers the advantage that when a photographic ocular is changed, the image area indicated in the microscope tube by a luminous frame decreases or increases automatically depending on the particular ocular magnification. In addition, the multiple markings of image fields on the reticle, required by the prior art, are eliminated. When photographic zoom oculars are used, the luminous frame continuously adjusts its size and thus allows optimal adaptation of the image field to the size of the object. It is an advantage, especially in the enlarged zoom region, that the otherwise required markings be eliminated.

When rigorously geometric structures are photographed, for instance integrated circuits, or objects with strongly textured structures with preferred directions in the particular details, an optical adaptation or alignment takes place advantageously by rotating the attachment camera, the luminous frame in the tube view automatically also rotating, whereby a mechanically complex microscope turntable is eliminated. Another advantage of the present invention is obtained in that the present attachment camera is used with reflecting (binocular) tubes and microscopes of earlier designs are useful. Finally, the attachment camera equipped according to the present invention permits the viewer to work in fatigue-free manner by retaining the conventional microscope viewing height, which is not altered by an inserted zoom optic at a penalty to the user.

BRIEF DESCRIPTION OF THE DRAWINGS

A schematic illustrative embodiment of the present invention is discussed below with reference to the appended drawings, wherein:

FIG. 1 is a schematic view of the essential subassemblies of the apparatus of the present invention;

FIG. 1a is a view in vertical cross section of the holding means for the photographic ocular of FIG. 1;

FIG. 2 is a detailed view of an image of the object with a superposed luminous frame, the object details essentially being isomorphic-isotropic;

FIG. 3 is a detailed view of an image of the object with superposed luminous frame, the object details essentially being isomorphic-anisotropic;

FIG. 5 is a detailed view along line 5—5 of FIG. 1, showing the attachment rest surface at the objective end of holding means 5a.

DESCRIPTION OF THE PREFERRED EMBODIMENTS

Figure 4:
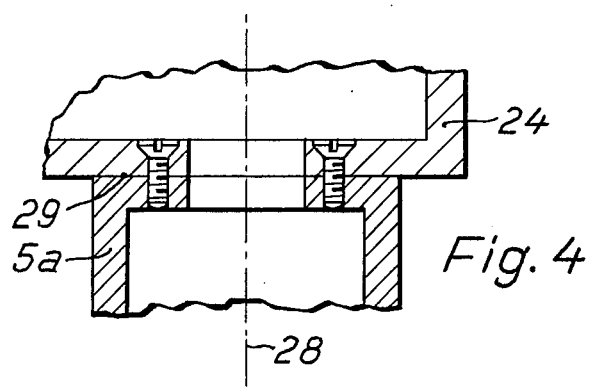
FIG. 4 is a detailed view of the detachable joint between housing 24 and holding means 5a facilitating a rigid connection as seen along lines 4—4 of FIG. 1.
Figure 4A:
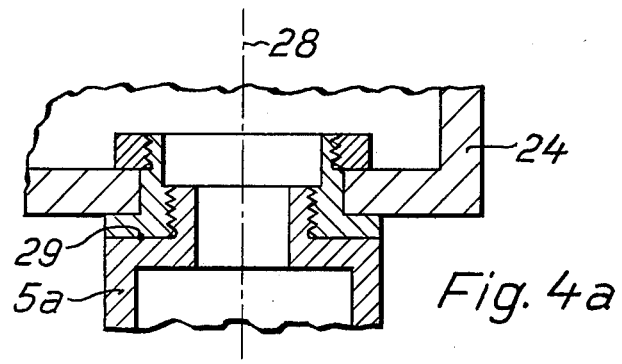
FIG. 4a is a detailed view of another embodiment of the detachable joint between housing 24 and holding means 5a facilitating a rotatable coupling as seen along lines 4—4 of FIG. 1.
Figure 5:
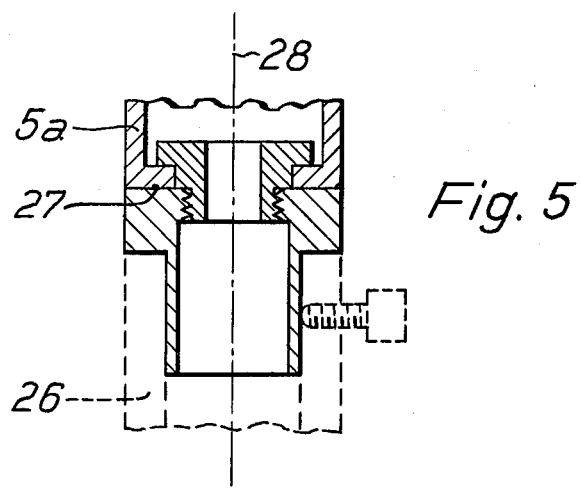

FIG. 1 shows in schematic form those components or subassemblies previously shown in perspective in FIG. 1 of U.S. Pat. No. 4,118,719. Identical components in both drawings therefore are designated by the same reference numerals for greater clarity.

A binocular tube housing 25 is constructed as a separate subassembly containing a beam splitting prism 2. At the splitting surface of the beam splitting prism an imaging beam 28 from object 3 following its passage through a microscope objective 1 is partly reflected, and upon renewed reflection from the base surface of the beam splitter 2 passes along observation beam 8 into an ocular or binocular 4. This beam is the actual viewing beam.

That part of the imaging beam 28 passing through the beam splitter 2 in the direction of the vertical optical axis arrives at a photographic ocular 5 seated in exchangeable manner in a holding means 5a. From there the imaging beam enters the actual attachment camera housing subassembly 24, first through a beam-splitting cube 6 and then through a camera shutter 7 and a camera objective 9, thus reaching the film plane 10. This is the actual imaging beam path.

Part of the imaging beam is tapped off at the beam-splitting cube 6 as a measuring beam 30 passing through an objective 11, a further splitting cube 12 and upon partial reflection from splitting cube 12 through a field lens 13 and a detail metering field stop 14 mounted in 2-coordinate displaceable manner as shown in U.S. Pat. No. 4,118,719.

After leaving the metering field stop 14, the measuring beam is incident upon a deflecting mirror 16a in its operational position from where the measuring beam passes through a field lens to a light detector 17, for example a photodiode or a secondary electron multiplier.

When the deflecting mirror 16a is in the out-of-the-way end position, as shown in dotted lines, it allows passage to an illumination beam from a light source 18a such as a fiber optic that is used for the reverse reflection of the detail metering field stop 14 into the first image plane of the binocular 4, this light source beam from 18a also passing through a lens 20 and a triple mirror 21.

A second light source or fiber optic 18b illuminates through a lens 23 a reticle 22 from the rear, this reticle comprising image format markings and these markings are imaged through the splitting prisms 13, 6 and 2 onto the first image plane of binocular 4. The imaging rays from splitter cube 12 follow the same path as those rays imaging the metering field stop, that is, they go through objective 11, splitter cube 6, photographic ocular 5, beam splitter 2, lens 20 and triple reflector 21.

FIG. 1 shows three subassemblies:

(1) a housing 24 of the attachment-camera;
(2) a housing 25 for the binocular tube with integral photographic stubs 26; and
(3) a holding means 5a for seating photographic oculars.

The holding means 5a represent the mechanical coupling and connecting means between the modular groups 24 and 25. At the holding means end facing housing 24 of the attachment camera it comprises a coupling device for detachably mounting to housing 24 and comprising an annular attachment resting surface 29. The coupling device establishes a rigid connection between housing 24 and holding means 5a which prevents any relative motion between them. The coupling device can also provide in another embodiment that the camera housing 24 is rotatably supported about the optical axis on the attachment resting surface 29.

At the holding means end region facing toward the housing 25 of the binocular tube, the holding means comprises a cylindrical constriction with an annular attachment resting surface 27 forming a plug-in sleeve with dimensions corresponding to the photographic stub 26, whereby precisely fitted positioning of the holding means 5a into the stub 26 is ensured. When the camera housing 24 and the holding means are so coupled, they do not rotate relative to one another, and a rotation of camera housing 24 for the purpose of aligning the image format boundaries with respect to the object detail structure is desired or necessary, the plane of rotation coincides with the plane of the attachment resting surface 27.

The holding means 5a is provided in its inside part with means for centering and precision-seating a particular photographic ocular 5. One photographic ocular is rapidly exchanged against another with a different magnification on account of the problem-free decoupling of the holding means from at least one of the building blocks 24 and 25. In particular, a zoom photographic ocular replaces a conventional photographic ocular, the actuation of the zoom means being obtained mechanically, for instance by means of a coaxial focusing ring, or by electrical control and drive means.

Elements 32, 34, 36 and 38 of the holding means 5a and their use in centering and precision seating of ocular 5 are an inner cylindrical recess 34 with a shoulder 36 for holding the photographic ocular 5, an outside sleeve 32 fitting over the ocular and holding it in place by gravity and an arresting screw 38 for the photographic ocular 5.

FIG. 2 shows the image of an object 3 consisting of a plurality of essentially the same object details 3a isotropically filling the entire image area, If for instance after an integrated measurement the observer wants to pass to a detailed measurement and measure the object detail 3a located at the center, then he can optimally adapt the image format markings 22 to the geometry of the particular object detail 3a by using and acutating a zoom photographic ocular. In the case shown, there is no need for azimuthally aligning the attachment camera thereby to the the rectangular format markings 22, with respect to the structure of the object detail 3a.

Such an alignment, however, is desirable in the example shown in FIG. 3. The object details 3b evidence a marked texture (anisotropy). The filamentary structures are mutually parallel. The observer attempts to align the longer sides of the rectangle of the image format markings with the direction of flow of the object details 3b. This is accomplished by the invention without using a turntable by rotating the attachment camera about its vertical optical axis 28. After the photographic zoom ocular is rotated, the length of the rectangular image format marking 22 is adapted to the length of the filamentary object detail 3b.

We claim:

1. In a microscope and attachment camera therefor having an observation beam with a system for measuring the brightness of an object detail and with markings for indicating at least the detail metering field and the image field of the camera in said observation beam, wherein a metering field marking (14) is positioned on a first plate and an image field marking (22) is positioned on a second plate, said first plate defined by a metering field stop (14), said metering field marking and said image field marking differing in shape and size (14,22) and being simultaneously reflected into said observation beam through a photographic ocular (5), said photographic ocular having an imaging beam (28) passing therethrough, the improvement comprising:
   a housing (24) for said attachment camera, at least one binocular tube (25) on said microscope;
   holding means (5a) seating in exchangeable manner said photographic ocular (5) provided between said housing (24) and said binocular tube 25; and
   said holding means connected to said housing for simultaneous rotation therewith whereby said object detail is aligned with said image field marking without rotation of said object.

2. The microscope and attachment of claim 1, wherein said holding means (5a) has means for detachably joining said holding means to said housing (24).

3. The microscope and attachment camera of claim 1, wherein said holding means (5a) having a camera side region and an object side region comprise an annular attachment rest surface (29) at said camera side region and an annular attachment rest surface (27) at said object side region and a tubular photographic stub (26) mounted on said binocular tube (25) having a hollow cylinder geometry corresponding to the attachment rest surface (27) for partly seating said holding means (5a).

4. The microscope and attachment camera of claim 3, wherein said housing (24) has means for supporting said attachment camera for rotation about said imaging beam (28).

5. The microscope and attachment camera of claim 3, wherein said housing (24) has means for supporting both said attachment camera and said holding means for rotation about said imaging beam (28).

6. The microscope and attachment camera of claim 1, wherein said photographic ocular is a zoom ocular.

* * * * *